July 14, 1936.  R. W. JOHNSON  2,047,510
GRILLE FASTENER AND INSTALLATION THEREOF
Filed Jan. 15, 1936
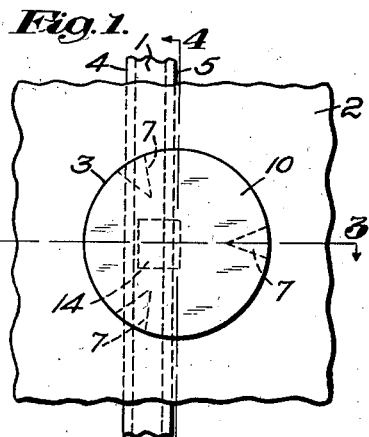
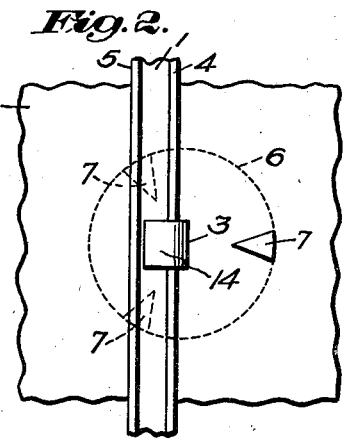
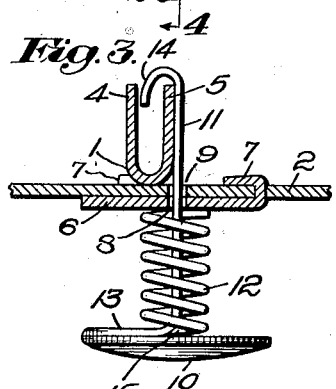
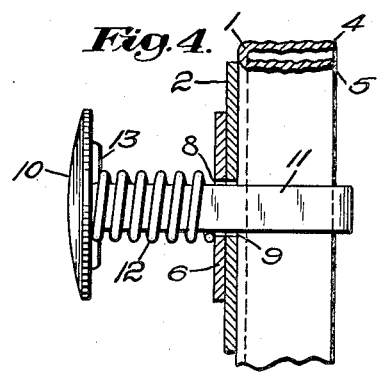
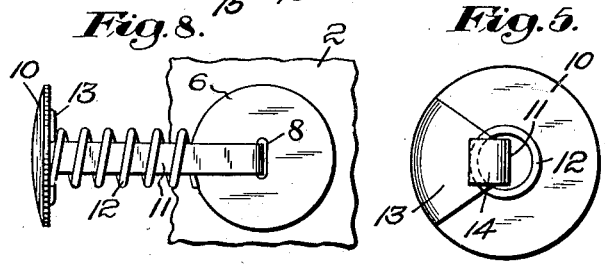
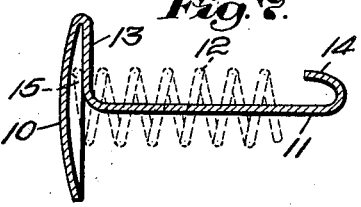
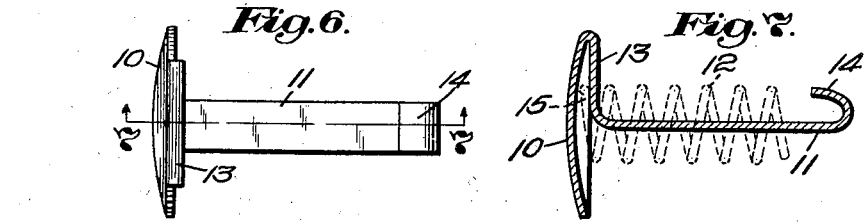
Inventor:
Russell W. Johnson
by Walter S. Jones
Atty.

Patented July 14, 1936

2,047,510

UNITED STATES PATENT OFFICE 2,047,510

GRILLE FASTENER AND INSTALLATION THEREOF

Russell W. Johnson, Detroit, Mich., assignor to United-Carr Fastener Corporation, Cambridge, Mass., a corporation of Massachusetts Application January 15, 1936, Serial No. 59,262

11 Claims. (Cl. 24—255)

My invention relates particularly, though not exclusively, to an improved fastener for automobile radiator grille covers and an installation for the same.

Referring to the drawing, which illustrates a preferred embodiment of my invention:—

Figure 1 is a fragmentary front view of a complete installation including my novel fastener, a portion of the covering material, and a portion of the support shown by the dotted lines;

Fig. 2 is a rear view of the installation shown in Fig. 1;

Fig. 3 is a section taken on the line 3—3 of Fig. 1;

Fig. 4 is a section taken on the line 4—4 of Fig. 1;

Fig. 5 is a front view of the fastener per se;

Fig. 6 is a side view of the fastener shown in Fig. 5 with the coil spring omitted;

Fig. 7 is a section taken on the line 7—7 of Fig. 6 with the coil spring shown in dotted lines; and—

Fig. 8 is a view of the installation showing the manner of inserting the fastener through the attaching plate and covering material.

The object of my invention is to provide a new and improved fastener for use in securing a flexible cover to an automobile radiator grille. My novel fastener is of simple and inexpensive construction and combines adaptability to various shapes and sizes of grille bars, firm holding qualities, and satisfactory means for easy engagement with and disengagement from a grille.

Referring first to the installation as a whole, as illustrated in Figs. 1-4, I have shown a single radiator grille bar 1, which is preferably of a construction now in common use, being substantially U-shaped in cross-section and presenting free edges at the rear ends of the oppositely disposed side walls 4 and 5. A sheet metal plate 6 is secured to the front of the covering material by means of attaching prongs 7 which are extended through the cover and then bent over to clench the material of the cover, as is most clearly shown in Fig. 3. The plate 6 is provided with an aperture 8 located in alignment with an aperture 9 of the covering material. The aperture 8 is of a relatively thin elongated shape, as illustrated in Fig. 8, for the purpose which will be hereinafter more fully described. The fastener 3 is provided with an arm which extends through the apertures 8 and 9 of the plate and covering material and engages the rear edge of one of the side walls of the supporting bar 1. The arm is held in engaged position by the action of a coil spring surrounding the arm and located between the head of the fastener and the plate 6.

Referring in more detail to the fastener member used in the installation, I have illustrated in Figs. 5-7 a preferred construction of my fastener having a head part 10, an arm 11, and a coil spring 12 surrounding the arm. The head and arm parts are formed preferably of one strip of sheet metal. The arm extends from beneath the head portion and is constructed, as shown in Fig. 7, by doubling a portion of the strip adjacent to the head underneath the head to form a connecting portion 13 and then extending the arm away from the inner end of the connecting portion in a substantially perpendicular direction to the head. The outer end of the arm is bent over to present, in my preferred form, a hook-shaped portion 14 adapted to hook over the rear edge of one of the walls of the bar 1, as clearly shown in Fig. 3. The coil spring 12 surrounds the arm and has a free end 15 extending between the head 10 and the connecting portion 13, as illustrated in Fig. 7, in which position the end 15 is clenched between the two parts thereby securing the spring in assembly with the fastener member. The head 10 provides a smooth portion to press on and gives a decorative appearance to the fastener.

The method by which the fastener is attached to the cover is clearly illustrated in Fig. 8. It is noted that the aperture 8 of the plate 4 is of such a size and shape that the free end only of the hook-shaped part 14 may be inserted through it in the initial attaching action (Fig. 8). The entire hook-shaped portion 14 is then extended through the apertures 8 and 9 by a slight rocking movement thereby permitting a portion of the straight length of the arm 11 to extend through the aperture. Ready separation of the fastener from the cover is practically impossible due to the fact that the distance from the free end of the part 14 to the opposite face of the arm 11 is considerably greater than the width of the aperture. Purposeful separation, however, is easily accomplished by reversing the action by which the fastener was attached to the cover.

In assembling the parts of the installation, the covering material 2, carrying the fastener member 3, is brought up to the grille bar 1, and as the head of the fastener is pressed toward the grille to permit the attaching means 14 to hook one of the outside edges of the side wall 5 of the bar 1, the coil spring will be contracted between the undersurface of the head 10 and the outward surface of the metal plate 6, as shown in Figs. 3 and 4. As pressure on the head is released, the spring will tend to expand toward normal position pushing the head outwardly so that the hook portion 14 will be secured by spring engagement with the grille bar. The fastener is quickly disengaged from the bar, if it should be so desired, by pressing on the head thereby contracting the spring sufficiently to permit the hook-shaped attaching means to be freed from engagement with the bar 1.

While I have only illustrated by the drawing a portion of a grille bar, it is understood that my fastener is intended to be used with any one of the several bars which make up an automobile grille structure. Furthermore, I intend a grille covering which is made of imitation leather or other suitable material and secured to the bars of the grille by any number of fasteners, to insure a satisfactory attachment.

Although I have illustrated and described a preferred embodiment of my invention, I do not wish to be limited thereby, because the scope of my invention is best set forth in the following claims.

I claim:

1. A fastener member having a head, an arm extending from beneath said head in substantially perpendicular relation thereto, said arm having a hook-shaped means integral with the outer end and extending out of the plane of said arm for engaging the part to which the fastener is to be attached, said head and said arm being formed out of one piece of sheet metal, and a coil spring surrounding said arm for the purpose described.

2. A fastener member having a head, a portion integral with said head and extending beneath said head for a predetermined distance and then outwardly at substantially right angles thereto to form an arm, a hook-shaped attaching means integral with the outer end of said arm for engaging a part to which the fastener is to be attached, and a coil spring surrounding said arm for the purpose described.

3. A fastener member having a head, a portion integral with the outside edge of said head and extending beneath said head for a predetermined distance and then outwardly at substantially right angles thereto to form an arm, a hook-shaped attaching means integral with the outer end of said arm, and a coil spring surrounding said arm, said spring having one end held between said head and said portion whereby said spring is maintained in secure assembly with said arm.

4. An installation of the class described comprising, in combination, a supporting member, a covering material for said supporting member having an aperture therethrough and a fastener member securing said covering material to said supporting member, said fastener having a head spaced from said covering material, an arm extending from said head through said aperture, said arm having an attaching means engaging the supporting member, and a resilient means associated with said arm and located between said head and said support for the purpose described.

5. An installation of the class described comprising, in combination, a supporting member, a covering material for said supporting member having an aperture therethrough, a plate attached to the covering and located on the other side of said covering from said support, said plate having an aperture therethrough in alignment with the aperture of said covering, and a fastener member securing said covering material to said supporting member, said fastener having a head spaced from said covering material, an arm extending from said head through said apertures, said arm having an attaching means engaging the supporting member, and a resilient means associated with said head and located between said head and said plate for the purpose described.

6. An installation of the class described comprising, in combination, a bar-like supporting member, a covering material for said supporting member having an aperture therethrough, a plate attached to the covering and located on the other side of said covering from said support, said plate having an aperture therethrough in alignment with the aperture of said covering, and a fastener member securing said covering material to said supporting member, said fastening member having a head, an arm extending from said head through the apertures of said plate and said covering, said arm having an integral attaching means engaged with said supporting member and a resilient means associated with said head and located between said head and said plate for the purpose described.

7. An installation of the class described comprising, in combination, a bar-like member, a covering material for said supporting member having an aperture therethrough, a metal plate attached to the covering and located on the other side of said covering from said support, said plate having an aperture therethrough in alignment with the aperture of said covering, and a fastener member securing said covering material to said supporting member, said fastener having a head, an arm extending from beneath said head in substantially perpendicular relation thereto, said arm having an attaching means integral with the outer end extending out of the plane of said arm and engaging said supporting member, and a resilient means surrounding said arm and located between said head and said plate for the purpose described.

8. An installation of the class described comprising, in combination, a bar-like supporting member, a covering material for said supporting member having an aperture therethrough, a metal plate attached to the covering and located on the other side of said covering from said support, said plate having an aperture therethrough in alignment with the aperture of said covering and a fastener member securing said covering to said supporting member, said fastener member having a head, an arm extending from beneath said head in substantially perpendicular relation thereto, said arm having hook-shaped attaching means integral with the outer end engaging the supporting member, and a coil spring surrounding said arm for the purpose described.

9. An installation of the class described comprising, in combination, a supporting member having front and rear surfaces a covering material for said supporting member having an aperture therethrough, a metal plate attached to the covering and located on the other side of said covering from said support, said plate having a relatively narrow aperture therein in alignment with the aperture of said covering and a fastener member securing said covering material to said supporting member, said fastener having a head spaced from said covering material, an arm extending from said head through said apertures, said arm having an attaching means engaging the rear surface of said supporting member, said attaching means being of such shape as to prevent the withdrawal thereof through the narrow aperture of said plate by a direct axial pull, and a resilient means associated with said arm and located between said head and said plate for the purpose described.

10. An installation of the class described comprising, in combination, a part having narrow bar-like members, each of said members being substantially U-shaped in cross-section thereby presenting oppositely disposed side walls, a covering material for said bar-like members having an aperture therethrough, a metal plate attached to the covering and located on the other side of said covering from said members, said plate having a relatively narrow aperture therein in alignment with the aperture of said covering and a fastener member securing said covering material to one of said bar-like members, said fastener having a head spaced from said covering material, an arm extending from said head through said apertures, said arm having a hook-shaped attaching means hooked over the outer edge of one of the side walls of said bar-like member, the distance between the outer end of said attaching means and said arm being greater than the width of the aperture of said plate thereby preventing the withdrawal of said attaching means through said plate by a direct axial pull, and a coil spring surrounding said arm and located between said head and said plate for the purpose described.

11. In combination with a cover of the class described having an aperture therethrough, a metal plate secured to said cover, said plate having a relatively long narrow aperture therethrough in alignment with the aperture of said cover, and a fastener member, said fastener having a head, an arm extending from said head having a hook-shaped attaching means integral with the outer end and of the same width thereof, the distance between the free end of said attaching means and said arm, and the width of said arm, being greater than the width of said aperture, whereby said attaching means is extended through said aperture by a rocking movement.

RUSSELL W. JOHNSON.